United States Patent [19]

Kuch et al.

[11] Patent Number: 5,160,562
[45] Date of Patent: Nov. 3, 1992

[54] PROCESS FOR PRODUCING A HOLLOW FIBER-COMPOSITE BODY

[75] Inventors: Ingo Kuch; Jürgen Kretschmer, both of Esslingen, Fed. Rep. of Germany

[73] Assignee: Daimler-Benz AG, Fed. Rep. of Germany

[21] Appl. No.: 743,482

[22] Filed: Aug. 8, 1991

[30] Foreign Application Priority Data

Sep. 8, 1990 [DE] Fed. Rep. of Germany ....... 4028583

[51] Int. Cl.⁵ .............................................. B32B 31/04
[52] U.S. Cl. .................................. 156/189; 156/256; 156/257; 264/138; 264/258
[58] Field of Search ............... 156/250, 256, 257, 185, 156/184, 189, 192, 267, 513; 264/257, 258, 162, 163, 158, 159, 160, 138, 259, 271.1

[56] References Cited

U.S. PATENT DOCUMENTS 3,115,988 12/1963 Warnken ............................ 156/189

FOREIGN PATENT DOCUMENTS 3630594 2/1988 Fed. Rep. of Germany .
999574 7/1965 United Kingdom .

Primary Examiner—Jay H. Woo
Assistant Examiner—James P. Mackey
Attorney, Agent, or Firm—Evenson, Wands, Edwards, Lenahan & McKeown

[57] ABSTRACT

A process for producing a hollow composite-fiber body from wound fibers, running in a plurality of directions and embedded in a curable or fusible plastics composition, having at least one lug integrated without any interruption into the fiber-composite and protruding from the hollow fiber-composite body. This process includes forming a plastics-impregnated and circumferentially continuously wound jacket by winding one layer over the other on a shaping core a plurality of layers of at least one prepreg web having web-bound, crossing groups of parallel-running fibers. The lug is shaped and secured by a support corresponding to a set-up lug shape and which protrudes during winding from the shaping core. Immediately after the running on of the prepreg web onto the shaping core or the wound body which is forming, into the prepreg web for each separate layer a lug free cut is made that corresponds to the position and contour of the respective lug. The lug free cut is set up separately and pressed into place without any folds onto the support or onto the prepreg layers already laid there for the lug with each revolution of the shaping core and for each lug to produce a finished shaped blank. The finished shaped blank is then cured. This process thereby allows the forming of lugs, tabs, flanges or the like without any folds in their root region.

2 Claims, 1 Drawing Sheet

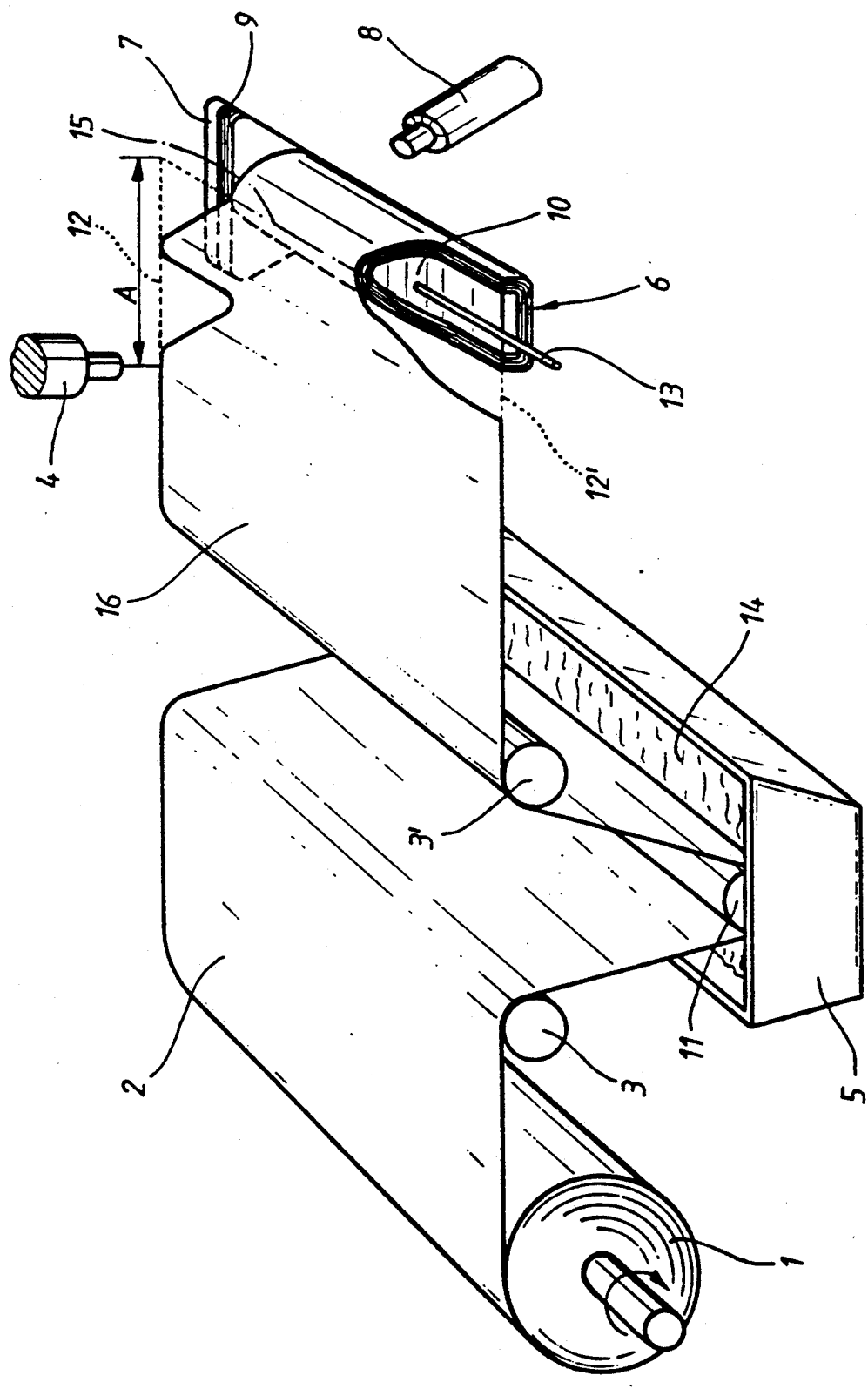

PROCESS FOR PRODUCING A HOLLOW FIBER-COMPOSITE BODY

BACKGROUND AND SUMMARY OF THE INVENTION

The present invention relates to a process for producing a hollow composite-fiber body from wound fibers, running in a plurality of directions and embedded in a curable or fusible plastics composition, having at least one lug integrated without any interruption into the fiber-composite and protruding from the hollow fiber-composite body. In this process, a plastics-impregnated and circumferentially continuous wound jacket is produced on a wound body, the lug is freed by cuts and set up, an the finished shaped blank of the hollow fiber-composite body is cured.

In the case of the above generic process, fibers impregnated with curable plastic are wound crosswise around an elongated, shaping winding body. To form lugs, tabs, flanges or the like (referred to hereinafter throughout as lugs) protruding from the later formed hollow fiber-composite body, after winding the fibers on the hollow body in the region of the lug to be formed, the lug is freed by cuts and exposed in a shaping manner. Finally, the part is cured.

However, since winding is performed only with a single fiber, this process is very time-intensive and consequently cost-intensive. Furthermore, during the setting-up of the lugs, the differing radii of the fiber layers previously wound with the fiber cause bulges in their curvatures or folds of the individual fiber layers, which prevent or eliminate an intimate contact of the individual layers.

The object of the invention is therefore to provide an improved process to produce a hollow fiber-composite body with lugs without any folds in the root region of the lugs.

This and other objects are achieved by the present invention which provides a process for producing a hollow composite-fiber body from wound fibers, running in a plurality of directions and embedded in a curable or fusible plastics composition, having at least one lug integrated without any interruption into the fiber-composite and protruding from the hollow fiber-composite body. This process includes forming a plastics-impregnated and circumferentially continuously wound jacket by winding one layer over the other on a shaping core a plurality of layers of at least one prepreg web having web-bound, crossing groups of parallel-running fibers. The lug is shaped and secured by a support corresponding to a set-up lug shape and which protrudes during winding from the shaping core. Immediately after the running on of the prepreg web onto the shaping core or the wound body which is forming, into the prepreg web for each separate layer a lug free cut is made that corresponds to the position and contour of the respective lug. The lug free cut is set up separately and pressed into place without any folds onto the support or onto the prepreg layers already laid there for the lug with each revolution of the shaping core and for each lug to produce a finished shaped blank. The finished shaped blank is then cured.

By cutting into the prepreg web, or a fiber lay which is preimpregnated and/or provided with fusible fibers, in a way corresponding to the lug shape and the lug position immediately before running onto the wound body, each lug free cut of each prepreg winding can, individually and already during winding, be set up and pressed into place without any folds layer by layer at its corresponding support arranged on the wound body, or lug support, or at the previous lug free cut. Since these processing steps are performed within one working step and with prepreg webs, the fabrication time is also reduced in an advantageous way in comparison with the filament winding technique.

Other objects, advantages and novel features of the present invention will become apparent from the following detailed description of the invention when considered in conjunction with the accompanying drawings.

BRIEF DESCRIPTION OF THE DRAWINGS

The single drawing figure illustrates an apparatus for carrying out an embodiment of the process of the present invention.

DETAILED DESCRIPTION OF THE DRAWINGS

In the single drawing, an apparatus for carrying out the process of the present invention is illustrated. The apparatus has supply roller 1 of the fiber lay 2. After wetting with a curable plastic, the fiber lay 2 forms the prepreg web 16, and is wound to become the hollow fiber-composite body which is in production, here a cantilever beam for the suspension of an engine or a gearbox in a motor vehicle.

The fiber lay 2, which is produced from a plurality of prefabricated, multidirectionally running fibers and is wound up on the supply roller 1, is drawn off in the direction of the product to be produced. By means of a first deflection roller 3, the fiber lay 2 is fed to the wetting unit, here a trough 5, which contains a curable plastics composition 14 and a wetting roller 11 mounted therein. The wetting roller 11 deflects the web upwards again in the direction of a second deflection roller 3'. The second deflection roller 3' transfers the now plastics-wetted prepreg web 16 to the cutting unit 4.

The cutting unit 4 is at a known distance A from the run-on line 15 (here shown by dot-dashed lines), along which the prepreg web 16 runs onto the wound body 6 of the product to be fabricated. With the cutting unit 4, the prepreg web 16 is cut according to the respective position and contour of the respective lug 9. It should be understood that the term "lug" throughout this description also can refer to a tab, flange or the like. The previous running line of the prepreg web side 12, 12' is shown by dotted lines.

After the cutting unit 4, the web 16 passes to the shaping core 10, which has for each lug 9 a support (lug support 7) corresponding to the set-up lug shape and already protruding during winding, for shaping and securing the lug 9. During fabrication of the hollow fiber-composite body, the shaping core 10 rotates about its axis of rotation 13, the wound body 6 winding off from the cut-to-size prepreg webs 16 on the shaping core 10. During this winding off, each lug free cut made in advance by the cutting unit 4 is set up separately and placed by means of a pressing unit 8 without any folds onto the associated lug support 7 or onto the lug free cuts already laid there for the lug 9. In this manner, each of the prepreg webs 16, in particular also in a root region of the lugs 9, is completely in connection with the prepreg web wound before and after.

In some cases, to reduce contaminations or to be able to dispense with the trough 5, instead of the wetting with curable plastic, fiber lays are used which are pre-impregnated with the plastic or which are provided with fusible synthetic fibers and are consolidated under the application of heat and by pressing to form the wound body 6. This produces very good properties for applications where the product is subjected to various stresses.

With the process of the present invention, the construction of various products can be made to correspond to the respective ideal case in terms of the geometry, without other, previously occurring complications having to be taken into consideration. Furthermore, a unit which operates on the basis of this process can be substantially automated, for example by the cutting unit 4 being designed as a laser, water jet or the like controlled by an industrial robot. Of course, it must be taken into account in controlling the cutting unit 4 that the wall thickness of the wound body 6, and consequently also its circumference, increases per revolution. Once the final wall thickness or the intended wall thickness of the hollow fiber-composite body has been reached, the prepreg web 16 is cut transversely to its direction of transport, the wound hollow body is cured and subsequently the shaping core 10 is removed.

Appropriate base materials for the fiber lays 2 or prepreg webs 16 are glass fibers, carbon fibers and/or aramid fibers, whereas the shaping core 10 is advantageously fabricated from filled or unfilled plastics as well as metals.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Process for producing a hollow fiber reinforced plastic composite body from wound fibers, running in a plurality of directions and embedded in a curable plastics matrix, having at least one lug integrated without any interruption into the fiber reinforced plastic composite body and protruding from the hollow fiber reinforced plastic composite body, comprising:

a) forming a plastics-impregnated and circumferentially continuously-wound jacket by continuously winding with a plurality of revolutions onto a shaping core a plurality of layers of at least one fiber reinforced plastic web comprising crossing groups of parallel-running fibers embedded in a plastic matrix;
   b) shaping and securing the lug by a support corresponding to a set-up lug shape and which protrudes during winding from the shaping core;
   c) cutting into the web for each separate layer during winding a lug free cut that corresponds to the position and contour of the respective lug;
   d) pressing the web around the lug free cut into place without any folds onto said support or onto the layers already laid onto said support with each revolution of the shaping core and for each lug to produce a finished shaped blank; and
   e) curing the finished shaped blank.

2. Process for producing a hollow fiber reinforced plastic composite body from wound fibers, running in a plurality of directions and embedded in a fusible plastics matrix, having at least one lug integrated without any interruption into the fiber reinforced plastic composite body and protruding from the hollow fiber reinforced plastic composite body, comprising:

a) forming a plastics-impregnated and circumferentially continuously wound jacket by continuously winding with a plurality of revolutions onto a shaping core a plurality of layers of at least one fiber reinforced plastic web comprising crossing groups of parallel-running fibers embedded in a plastic matrix;
   b) shaping and securing the lug by a support corresponding to a set-up lug shape and which protrudes during winding from the shaping core;
   c) cutting into the web for each separate layer during winding a lug free cut that corresponds to the position and contour of the respective lug;
   d) pressing the web around the lug free cut into place without any folds onto said support or onto the layers already laid onto said support with each revolution of the shaping core and for each lug to produce a finished shaped blank; and
   e) fusing the finished shaped blank.

* * * * *